Patented Mar. 12, 1946

2,396,236

UNITED STATES PATENT OFFICE 2,396,236

INHIBITING CORROSION OF ALUMINUM

Emile L. Baldeschwieler, Cranford, and John C. Zimmer, Union, N. J., assignors to Standard Oil Development Company, a corporation of Delaware No Drawing. Application September 4, 1941, Serial No. 409,518

1 Claim. (Cl. 44—69)

This invention is particularly concerned with inhibiting corrosion of aluminum caused by contact with contaminated water through the use of an efficient anti-corrosion agent.

Aluminum fuel tanks are used to a great extent in aircraft, and it is recognized that there is an important problem of preventing corrosion of these tanks when water collects and remains in them for extended periods. Test results have indicated that dry aviation fuels, leaded or not leaded, do not cause corrosion, but that aqueous solutions of metal salts, e. g., metal chlorides, accidentally introduced into the fuel, are generally the cause.

Special efforts are called for at present with respect to protection of aluminum and its alloys in fuel tanks of seaplanes and apparatus in submarines, wherein the metals become more exposed to corrosive salt water. While this problem is now very pressing with respect to articles having military use, it has existed for some time with respect to many types of industrial apparatus.

The object of the present invention is to provide a simple protective measure for preventing corrosion of aluminum bearing metals where precautions are not or cannot be taken to keep the surfaces of the metals dry.

In accordance with the present invention, it is found that high boiling monohydric alcohol esters of fatty acids introduced in small amounts into contaminated water having corrosive action on aluminum beneficially retard the corrosion of the aluminum.

Corrosion tests conducted with the ester inhibitors indicate that they are not all effective to the same extent for rendering the water contaminants inert to the aluminum, and this may be due to differences in the ability of the esters to become dissolved in the water as such, or by partial hydrolysis, and their ability to suppress the corrosive activity. The solubility of such esters in water is very low, consequently the ester content of any water present will generally be near the saturation point.

The beneficial type of corrosion inhibiting esters are of the low molecular weight alcohols having about 3 to 5 carbon atoms and saturated aliphatic monocarboxylic acids having about 12 to 20 carbon atoms, particularly with the alcohol having a branched structure, as in the case of isopropyl ester of oxidized wax acids and secondary amyl stearate. The normal esters, such as butyl stearate, were found to be less effective.

Experiments have shown that the ester inhibitors added to a leaded aviation fuel in the proportion of about 0.05% definitely retard corrosion, and in proportions of about 0.1% to about 1.0% prevent corrosion over an extended length of time.

To illustrate the invention, the following examples and test data are presented:

EXAMPLE 1

Tests were made with samples of aviation gasoline containing tetraethyl lead and admixed with distilled water. Aluminum was corroded by samples of this mixture in only 192 hrs. With 1% by weight of the isopropyl alcohol ester of wax fatty acids present in the mixture, the aluminum contacted by the mixture showed no signs of corrosion for over 1500 hours.

EXAMPLE 2

The following comparative tests were made by immersing aluminum strip specimens in a glass vessel containing water and leaded aviation gasoline:

Table

| Inhibitor added | No. of days | pH | Appearance of aluminum |
|---|---|---|---|
| Blank | 24 | 7.49 | Bad corrosion. |
|  | 39 | 7.50 | Do. |
| 0.75% Sec. amyl stearate | 24 | 6.55 | No corrosion. |
|  | 39 | 7.15 | Do. |
| 0.05% Sec. amyl stearate | 24 | 6.98 | Do, |
|  | 39 | 7.50 | Slight discoloration. |

As illustrated in the above data, it was found that the corrosion generally took place when the pH of the water reached 7.4.

Any minute quantities of the ester corrosion inhibitors which might remain in the fuel do not have any detrimental effect on the fuels.

It is to be understood that the present invention is not concerned with altering any quality of a fuel, nor is it limited in its use with a moisture containing fuel in protection of an aluminum fuel tank.

Good results are obtained by employing the ester corrosion inhibitors in a temporary coating on the surfaces of articles constructed of aluminum or its alloys, the coating being applied as a thin film by brushing, dipping, spraying, or otherwise. These inhibitors may be applied as such, or blended with any suitable vehicle, such as hydrocarbon solvents or oxygen-containing organic solvents. Inhibitors are useful in this manner, particularly when the article to be protected is not constantly immersed in or contacted by water but tends to collect moisture from the atmosphere. On the other hand, if protection is desired from an accumulated body of contaminated water; as, in a tank, pipe or vessel of any form, a small amount of the inhibitor, e. g., from about 0.001% to 0.01% or the limit of its solubility in the water, placed within the vessel or introduced into the water therein, gives effective prevention of corrosion, as illustrated in the following example:

EXAMPLE 3

In another set of experiments, aluminum was immersed in a salt water solution, and it was observed that secondary amyl ester added in a minute amount sufficient to saturate the water prevented corrosion of the aluminum for over 39 days.

We claim:

The method of preventing corrosion of aluminum fuel tanks containing a mixture of water and leaded gasoline, which comprises adding to the said mixture contained in said tanks about 0.1% to about 1% of an isopropyl alcohol ester of oxidized-wax fatty acids.

EMILE L. BALDESCHWIELER.
JOHN C. ZIMMER.